United States Patent [19]

Dahl et al.

[11] Patent Number: 4,678,434
[45] Date of Patent: Jul. 7, 1987

[54] BAKING FURNACE FOR ELECTRODES

[75] Inventors: Erik Q. Dahl; Arnfinn Vatland; Olaf T. Vegge, all of VÅgsbygd, Norway

[73] Assignee: Elkem a/s, Norway

[21] Appl. No.: 894,261

[22] Filed: Aug. 7, 1986

[51] Int. Cl.⁴ .............................................. F27D 1/18
[52] U.S. Cl. ..................................... 432/242; 34/242; 432/225; 432/229
[58] Field of Search ............... 432/242, 159, 173, 225, 432/229; 228/25; 34/242

[56] References Cited

U.S. PATENT DOCUMENTS

| | | | |
|---|---|---|---|
| 3,459,410 | 8/1969 | Uban | 432/225 X |
| 3,759,662 | 9/1973 | Bengel et al. | 432/242 |
| 3,997,288 | 12/1976 | Takaoka et al. | 432/242 X |
| 4,309,167 | 1/1982 | Kurz et al. | 432/242 X |
| 4,411,075 | 10/1983 | Blaudszun | 432/242 X |

Primary Examiner—Edward C. Favors
Attorney, Agent, or Firm—Lucas & Just

[57] ABSTRACT

The present invention relates to a baking furnace for continuous production of elongated carbon bodies having uniform cross section, the baking furnace being intended to be moved continuously or substantially continuously in relation to a casing containing unbaked carbonaceous electrode paste with a speed which corresponds to a preset baking speed for the carbon body. The baking furnace comprises an outer steel shell (5) and a refractory lining (6) arranged on the inside of the shell (5), said refractory lining (6) defining a combustion chamber (7). A cooling chamber (16) is arranged between the upper part (15) of the refractory lining (6) and the casing (3). Above the cooling chamber (16) there is provided gas sealing means (23). An off-gas channel (11) is arranged below the refractory lining (16).

8 Claims, 2 Drawing Figures

FIG. I.

BAKING FURNACE FOR ELECTRODES

The present invention relates to a baking furnace for continuous production of elongated carbon bodies with a substantially uniform cross section such as for example carbon electrodes for use in electric smelting furnaces, lining blocks, anode- and cathode elements in electrolytic cells for production of aluminium. The elongated carbon bodies may have any cross section, e.g. circular, rectangular or others.

It is known a method for production of elongated carbon bodies where unbaked carbonaceous electrode paste comprising a carbon material and a carbonaceous binder continuously is baked to a solid carbon body by charging the unbaked electrode paste into a casing having a cross section corresponding to the cross section of the carbon body to be produced, and continuously or substantially continuously lowering the casing down through a baking furnace to which baking furnace heat energy is supplied. It is further known to use a perforated casing whereby gases which evolve in the electrode paste by heating, flow from the electrode and into the baking furnace where they are combusted.

It has been observed that the gases which evolve during the heating of the electrode paste and flow into the baking furnace through the perforations in the casing, have a tendency to condense in the upper part of the baking furnace where the cold electrode casing containing cold electrode paste enters into the baking furnace. This condensate which consists of a large number of different hydrocarbon fractions, will eventually be carbonised in the upper part of the baking furnace and a layer of hard carbonized material will slowly build up and after some time, completely fill up the annulus between the baking furnace and the electrode casing. This will result in that after operation of the furnace for some weeks it will not be possible to move the casing and thereby the electrode relatively to the baking furnace. The growth in this layer of hard carbonized material in the upper part of the baking furnace must therefore more or less continuously be observed and at a certain time the baking process has to be stopped and the baking furnace has to be demounted in order to remove the layer of carbonized material. During removal of the layer of carbonized material, the baking zone in the carbon body is cooled, whereby an inhomogenity is produced in the elongated carbon body.

If the baking furnace is operating in direct connection with an electric smelting furnace for production of a carbon electrode which is directly used in the smelting furnace, the operation of the smelting furnace has to be shut down during the removal of the layer of carbonized material in the baking furnace. This will result in loss of production from the smelting furnace and in addition there will be a high risk of electrode breakage when the part of the electrode containing the above mentioned inhomogenity enters into the smelting furnace.

It is an object of the present invention to provide a baking furnace which prevents the build up of hard, carbonized material in the upper part of the baking furnace.

It is a further object of the present invention to provide an efficient gas sealing between the electrode casing and the upper part of the baking furnace in order to prevent gas leakages from the baking furnace to the environment.

Accordingly, the present invention relates to a baking furnace for continuous production of elongated carbon bodies having a substantially uniform cross section, wherein the baking furnace continuously or substantially continuously is moved relatively to the carbon body with a speed which corresponds to a preset baking speed for the carbon body.

According to the present invention the baking furnace comprises an outer shell made from steel and a refractory lining arranged on the inside of the shell which defines a combustion chamber about the carbon body which is being produced. A cooling chamber is arranged between the upper part of the refractory lining and the carbon body which is being produced, the lower part of the cooling chamber extending into the combustion chamber and the upper part of the cooling chamber extending above the refractory lining of the combustion chamber. In the lower part of the combustion chamber there is arranged a channel for the off-gases from the combustion chamber.

The cooling chamber preferably has internal channels for circulation of a cooling medium. Above the cooling chamber there is arranged a guide ring for guiding the carbon body through the baking furnace and a gas sealing to prevent gas leakages from the combustion chamber. The gas sealing preferably comprises a flexible gasket arranged between vertically arranged lower flanges which are affixed to a plate on the top of the cooling chamber and vertically arranged upper flanges which are affixed to another plate and where the distance between the upper and lower flanges and thereby the tightening of the gasket against the carbon body, can be adjusted by means of a plurality of bolts.

Further embodiments of the present invention will be evident from the claims.

The baking furnace according to the present invention will now be further described in connection with the drawings which shows a preferred embodiment of the present invention.

Figure 1:
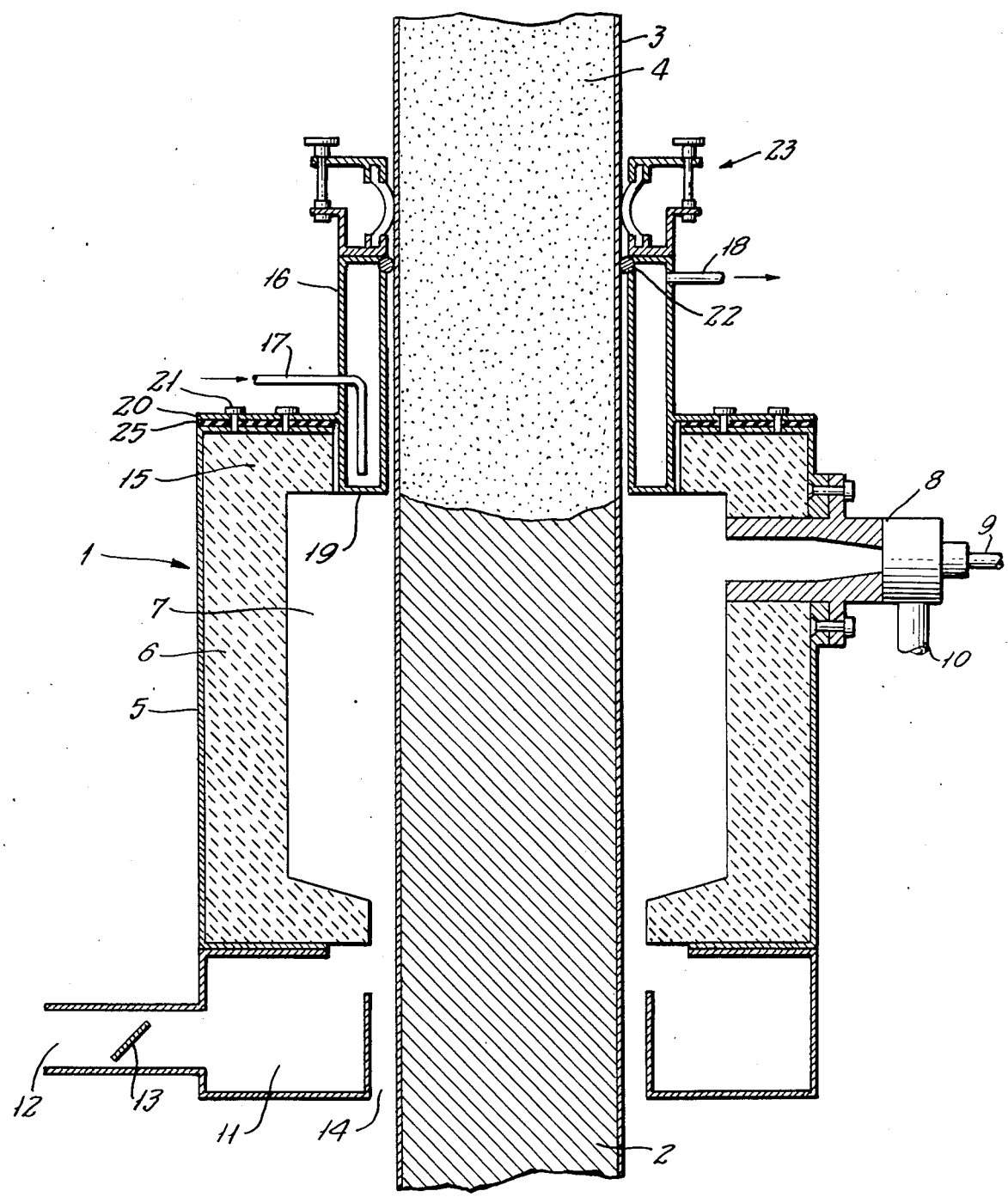
FIG. 1 shows a vertical cut through a baking furnace according to the present invention.

On FIG. 1 there is shown a baking furnace 1 for production of elongated carbon bodies 2. The baking furnace is arranged about a casing 3 for the carbon body 2. The casing 3 has a cross section which corresponds to the cross section of the carbon body.

Unbaked carbonaceous electrode paste 4 which consists of a carbon material and a carbonaceous binder is charged into the casing 3. By heating of the electrode paste 4 in the baking furnace 1, the electrode paste is baked into a solid carbon body 2. The casing 3 is preferably perforated (not shown) in order to allow gases which evolve during the heating of the electrode paste to flow through the perforations and into the baking furnace.

The baking furnace 1 comprises an outer shell 5 and a refractory lining 6 defining a combustion chamber 7. The combustion chamber 7 is heated to the necessary baking temperature by means of at least one burner 8 for solid, liquid or gaseous fuel. The burner or burners 8 are preferably tangentially arranged in relation to the combustion chamber 7. The burner 8 has supply pipes 9 and 10 for fuel and combustion air. Below the refractory lining 6 there is arranged a channel 11 for off-gases from the baking furnace 1. The off-gas is sucked out from the channel 11 through an off-gas pipe 12. In the off-gas pipe 12 there is arranged a valve 13 for regulating the volume of off-gas from the baking furnace.

The channel 11 has a central opening with a diameter slightly greater than the diameter of the baked carbon body 2. Between the channel 11 and the casing 3 for the carbon body 2 there will therefore be a slot 14. When the baking furnace 1 is in operation, environmental air is sucked in through the slot 14 and thereby provides a seal so that gases from the combustion chamber 8 will not escape through the slot 14.

In the upper part 15 of the refractory lining 6 of the baking furnace 1, there is provided an opening for the casing 3. This opening has a somewhat greater cross section than the cross section of the casing 3. In the annular slot between the upper part 15 of the refractory lining 6 and the casing 3 there is arranged a cooling chamber 16 for circulation of a cooling medium. The cooling chamber 16 has supply pipe 17 and return pipe 18 for the cooling medium which preferably is water. The cooling chamber 16 may be divided into section and each section may be provided with internal walls (not shown) in order to ensure a proper flow of cooling medium through the cooling chamber 16.

The cooling chamber 16 is arranged in such a way that its lower end is at about the same level as the lower end of the upper part 15 of the refractory lining 6 as shown on FIG. 1. The cooling chamber 16 extends upwardly to a level at least above the upper end of the upper part 15 of the refractory lining 6.

The cooling chamber 16 is affixed to the outer shell 5 via an annular plate 20 which is secured to the shell 5 by means of bolts 21.

If the baking furnace 1 is used for baking a carbon electrode in direct connection with an electric smelting furnace, electric insulation 25 is preferably inserted between the shell 5 on the bakihg furnace 1 and the annular plate 20.

Above the cooling chamber 16 there is secured a guide ring 22 made from rod iron or the like. The purpose of guide ring 22 is to guide the casing relatively to the baking furnace. In the area above the guide ring 22 there is arranged gas sealing means 23 for preventing gas leakages between the casing 3 and the baking furnace 1.

Figure 2:
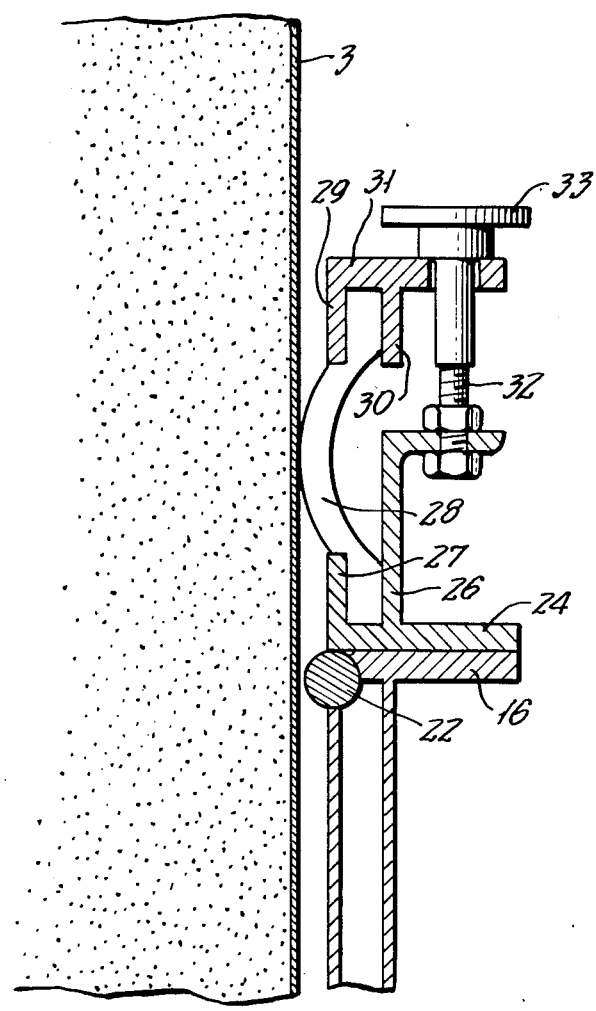
FIG. 2 shows an enlarged view of a part of FIG. 1.

The gas sealing means 23 is shown in enlarged scale on FIG. 2. The gas sealing means 23 comprises a lower annular plate 24 which is secured to the cooling chamber 16. To the plate 24 there is affixed two annular vertically running flanges 26 and 27. Between the flanges 26 and 27 there is provided a flexible gasket 28 made of a material having a high melting point. The upper end of the gasket 28 is arranged between annular vertical flanges 29 and 30 which are connected to a second annular plate 31. The second annular plate 31 is affixed to the flange 26 by means of a plurality of threaded bolts 32 having handles 33. By adjusting the distance between the first plate 24 and the second plate 31 by operating the handles 33, the flexible gasket 28 is tightened or loosened. The gasket 28 can be adjusted locally about the circumference of the casing 3 by operations of the handles 33.

In operation the baking furnace 1 is continuously or substantially continuously moved relative to the casing 3 with a speed corresponding to the preset baking speed for the carbon body 2. When the casing 3 with the unbaked electrode paste 4 enters into the baking furnace 1, the electrode paste is heated and the electrode paste then becomes liquid whereafter the paste is baked into a solid carbon body.

During the baking, carbonaceous gases evolve in the electrode paste. These gases flow into the baking furnace 1 through perforations in the casing 3 and most of the gases are immediately cumbusted by the combustion air which is supplied to the baking furnace.

A part of the gases will, however, condense on the cooling area 19 on the lower vertical part of the cooling chamber 16 where the temperature is kept below 400° C. by the cooling medium circulating in the cooling chamber. As the temperature in the baking chamber is in the interval between 700° and 1300° C., the part of the gases which come into contact with the cooling area 19 will condense. The temperature in the area of the cooling chamber 16 is, however, so low that the condensed gases will not be carbonized. The condensed gases will therefore drop down into the combustion chamber where they immediately will be combusted. The cooling chamber further provides that the gases in the annulus between the casing 3 and the cooling chamber is kept at a lower temperature. The gasket 28 is thereby protected against high temperature exposure. The lifetime for the gasket 28 will thereby be increased.

By the present invention it is thereby provided a baking furnace which can be operated for very long campaigns without operation difficulties due to build ups of layers of carbonized material. Further, a very good gas seal between the carbon body and the baking furnace is obtained, thereby minimizing the possibility for leakage of hazardous gases from the baking furnace to the environment.

What is claimed:

1. A baking furnace for continuous production of elongated carbon bodies having uniform cross-section, said baking furnace being intended to be moved continuously or substantially continuously in relation to a casing containing unbaked carbonaceous electrode paste with a speed which corresponds to a preset baking speed for the carbon body, characterized in that the baking furnace (1) comprises an outer steel shell (5) and a refractory lining (6) arranged on the inside of the shell (5) said refractory lining (6) defining a combustion chamber (7), a cooling chamber (16) arranged between the upper part (15) of the refractory lining (6) and the casing (3), gas sealing means (23) arranged above the cooling chamber (16) and an off-gas channel (11) arranged below the refractory lining (6).

2. Baking furnace according to claim 1, characterized in that the lower end (19) of the cooling chamber (16) is situated at substantially the same vertical level as the lower end of the upper part (15) of the refractory lining (6).

3. Baking furnace according to claim 1, characterized in that a guide ring (22) for guiding the casing (3) is arranged above the cooling chamber (16).

4. Baking furnace according to claim 1, characterized in that the gas sealing means (23) comprises a flexible gasket (28) which is arranged between vertical lower flanges (26, 27) affixed to a plate (24) and vertical upper flanges (28) which is arranged between vertical lower flanges (29, 30) affixed to a plate (31), and that the distance between the lower flanges (26, 27) and the upper flanges (29, 30) can be adjusted.

5. Baking furnace according to claim 4, characterized in that the distance between the lower flanges (26, 27) and the upper flanges (29, 30) is adjustable by means of a plurality of bolts (32).

6. Baking furnace according to claim 1, characterized in that the baking furnace has at least one burner (8) for solid, liquid or gaseous fuel.

7. Baking furnace according to claim 6, characterized in that the burner (8) is tangentially arranged relative to the combustion chamber (7).

8. Baking furnace according to claim 1, characterized in that the baking furnace (1) is equipped with at least one pipe (10) for supply of combustion air to the combustion chamber (7).

* * * * *